(12) United States Patent
Vernier (10) Patent No.: US 8,762,417 B2
(45) Date of Patent: Jun. 24, 2014

(54) EVENT IMPACT ANALYSIS (75) Inventor: Dominique Vernier, Brussels (BE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/580,828

(22) PCT Filed: Apr. 4, 2011

(86) PCT No.: PCT/EP2011/055166
§ 371 (c)(1),
(2), (4) Date: Aug. 23, 2012

(87) PCT Pub. No.: WO2011/138104
PCT Pub. Date: Nov. 10, 2011

(65) Prior Publication Data
US 2013/0041924 A1 Feb. 14, 2013

(30) Foreign Application Priority Data
May 4, 2010 (EP) .................................... 10161807

(51) Int. Cl.
*G06F 17/30* (2006.01)

(52) U.S. Cl.
CPC .... *G06F 17/30958* (2013.01); *G06F 17/30961* (2013.01); *G06F 17/30424* (2013.01)
USPC ........................................................ 707/798

(58) Field of Classification Search
CPC .................. G06F 17/30958; G06F 17/30961; G06F 17/30424
USPC ........................................................ 707/798
See application file for complete search history.

(56) References Cited

U.S. PATENT DOCUMENTS

| | | | |
|---|---|---|---|
| 6,694,362 B1* | 2/2004 | Secor et al. ................... | 709/223 |
| 6,954,749 B2* | 10/2005 | Greenblatt et al. ........... | 707/778 |
| 7,092,707 B2* | 8/2006 | Lau et al. ...................... | 455/423 |
| 7,478,404 B1* | 1/2009 | Campbell ..................... | 719/318 |
| 7,519,624 B2* | 4/2009 | Korupolu et al. ............. | 1/1 |

(Continued)

OTHER PUBLICATIONS

Yingchun Yuan et al., "Cost-effective Heuristics for Workflow Scheduling in Grid Computing Economy", IEEE 2007, The sixth International Conference on Grid and Cooperative Computing (GCC 2007).*

(Continued)

*Primary Examiner* — Pierre Vital
*Assistant Examiner* — Nargis Sultana
(74) *Attorney, Agent, or Firm* — Schmeiser, Olsen & Watts, LLP; John Pivnichny (57) ABSTRACT

A method and system for analyzing impact of an event on resources of a network. A directed graph is generated and includes nodes and edges. Each node represents a resource. Each edge connects, and is directed from, a predecessor node to a successor node. The event impacts the resource at an event node. A propagation time (PT) is determined for each edge. The PT is a time interval for an impact of the event to travel along each edge from the predecessor node to the successor node. An initial estimated impact time (EIT) is set for each node. The EIT for each node is an estimated time at which the event impacts each node. The EIT of each node that is directly or indirectly connected to the event node by one or more edges is updated. A list of the updated nodes is sent to an output device.

17 Claims, 10 Drawing Sheets

(56) References Cited

U.S. PATENT DOCUMENTS

| | | | |
|---|---|---|---|
| 7,904,726 B2* | 3/2011 | Elgezabal | 713/176 |
| 8,010,081 B1* | 8/2011 | Roskowski | 455/406 |
| 8,301,593 B2* | 10/2012 | Hoffmann et al. | 707/615 |
| 2005/0027845 A1* | 2/2005 | Secor et al. | 709/223 |
| 2005/0071458 A1* | 3/2005 | Fisher et al. | 709/224 |
| 2005/0181835 A1* | 8/2005 | Lau et al. | 455/567 |
| 2006/0036620 A1* | 2/2006 | Bigwood et al. | 707/100 |
| 2007/0112870 A1* | 5/2007 | Korupolu et al. | 707/640 |
| 2009/0177927 A1 | 7/2009 | Bailey et al. | |
| 2009/0281845 A1 | 11/2009 | Fukuda et al. | |
| 2011/0219208 A1* | 9/2011 | Asaad et al. | 712/12 |
| 2011/0282860 A1* | 11/2011 | Baarman et al. | 707/709 |
| 2012/0166616 A1* | 6/2012 | Meehan et al. | 709/224 |
| 2012/0215492 A1* | 8/2012 | Masurkar | 702/185 |
| 2012/0215912 A1* | 8/2012 | Houlihan et al. | 709/224 |
| 2014/0019490 A1* | 1/2014 | Roy et al. | 707/798 |

OTHER PUBLICATIONS

Asan, et al.; Qualitative Cross Impact Analysis with Time Consideration; 35th International Conference on Computers and Industrial Engineering; 2005; 6 pages.

PCT International Search Report and Written Opinion (with Notice of Transmittal); Mailing Date Jun. 1, 2011; International Application No. PCT/EP2011/055166; Filing Date Apr. 4, 2011; 12 pages.

Notice from the European Patent Office dated Oct. 1, 2007 Concerning Business Methods; Official Journal EPO Nov. 2007; pp. 592-593.

* cited by examiner

| R-> | 602 | 604 | 606 | 608 | 610 | 612 | 614 | 616 | 618 | 620 | 622 |
|---|---|---|---|---|---|---|---|---|---|---|---|
| 1 | ∞ | ∞ | ∞ | ∞ | ∞ | ∞ | 12:00 | ∞ | ∞ | ∞ | 08:00 |
| 2 | ∞ | ∞ | ∞ | ∞ | 11:00 | 10:00 | 12:00 | 10:00 | 11:00 | ∞ | 08:00 |
| 3 | ∞ | 11:00 | ∞ | ∞ | 11:00 | 10:00 | 12:00 | 10:00 | 11:00 | ∞ | 08:00 |
| 4 | ∞ | 11:00 | 12:00 | ∞ | 11:00 | 10:00 | 12:00 | 10:00 | 11:00 | ∞ | 08:00 |
| 5 | 11:00 | 11:00 | 12:00 | ∞ | 11:00 | 10:00 | 12:00 | 10:00 | 11:00 | ∞ | 08:00 |
| 6 | 11:00 | 11:00 | 12:00 | ∞ | 11:00 | 10:00 | 12:00 | 10:00 | 11:00 | ∞ | 08:00 |
| 7 | 11:00 | 11:00 | 12:00 | ∞ | 11:00 | 10:00 | 12:00 | 10:00 | 11:00 | ∞ | 08:00 |
| 8 | 11:00 | 11:00 | 12:00 | ∞ | 11:00 | 10:00 | 12:00 | 10:00 | 11:00 | ∞ | 08:00 |
| 9 | 11:00 | 11:00 | 12:00 | ∞ | 11:00 | 10:00 | 12:00 | 10:00 | 11:00 | ∞ | 08:00 |
| 10 | 11:00 | 11:00 | 12:00 | ∞ | 11:00 | 10:00 | 12:00 | 10:00 | 11:00 | ∞ | 08:00 |

EVENT IMPACT ANALYSIS

FIELD OF THE INVENTION

The present invention relates generally to the field of resource failure impact analysis and more particularly to a system and method for determining the dead lines to intervene on resources impacted by external events before these events impact other resources.

BACKGROUND ART

IT system often deals with resources and their availability. In case of an event occurs on a resource, it is important to predict when other resources will be impacted by this event and if they are. Knowing when a resource will be impacted will help to organize the actions to take to avoid the impact on business critical resources.

IT Systems are not anymore monolithic or siloed. With new technologies, such as Service Oriented Architecture, an end-user application uses different services provided by other systems and these services also can use other services and so on. So, connections exist between the end-user applications and services. These services use also other systems, such as web-servers, application-servers, databases and so on. This is another level of connections. These intermediate systems could be impacted by events occurred on other components. This is not only true at the application level components but also at the infrastructure level. The systems such as the above mentioned (end-user applications, services, databases . . . ) need an infrastructure to run. The infrastructure is a composition of servers, network, routers, coolers, power supply . . . . Each of these components is in fact a resource which must be available at a certain moment to respect the business need and these resources are linked to each other because some resources serves others to get them fully operational.

It is also possible that a resource provides a service to another resource in an asynchronous way. For example, if a resource is impacted by an event, it doesn't mean that the connected resources are directly impacted. The connected resources could only need the impacted resource every two hours and thus if the impact is cleared within two hours the connected resource will never be impacted by this event. So, there is the need of accurately knowing when a resource is impacted to avoid impact propagation. This means that an event propagation time exists on connections.

In U.S. 20090177927A1 from Bailey et al. a method and system for determining an impact of a failure of a component for one or more services that the component is supporting is disclosed. A system status of the component identifies whether the component has failed or is active. The one or more services is mapped into a calendar function. After determining that the component supports the one or more services, a lookup in the calendar function is performed to identify a temporal activity and a level of criticality of each service of the one or more services. An impact of the system status of the component on the one or more services is determined from analysis of the identified temporal activity and the identified level of criticality of the one or more services.

High available systems are build with redundant components to avoid that an event impacts the functionality provided by the system. In such systems if one of the redundant components is impacted it would be interesting to know when the functionality supported by the redundant components will be impacted, thus determining how much time leaving to react to avoid this impact.

Several approaches exist to determine a time-line of impacts of a failed resource on one or more dependent resources.

In U.S. Pat. No. 7,092,707 from Lau et al. a system for the prioritization of quality of service (QoS) alerts and the analysis of the impact of such alerts on service uses a service model in which services are broken into one or more service components and sub-components. Creation of a service dependency model, which is driven by different phases of a service, allows to understand how alerts at the lowest level of the network components affect the overall service for which they are but a component.

In U.S. 20090281845A1 issued to the Assignee, a method and system for constructing and exploring key performance indicators (KPI) networks is described to identify KPIs associated with a performance target. Correlated or dependent KPIs are determined and correlations or dependencies are weighed to provide the degree of relevance in the KPI network. Influential chains in the correlation are determined. KPIs and associated correlations may be mined using historical data.

Whereas the prior art provide operational solutions to the cited needs, there is still the lack of a solution to analyse the impact(s) of mutliple resources failure on other resources.

Additionally, still lacking is a solution to provide a list of resources-failure date to show overtime which is/are the next resource(s) in the failure chain and determine the time leaved until the next resource(s) will failed.

The present invention offers a solution to these needs.

SUMMARY OF THE INVENTION

Accordingly, an object of the invention is to provide a system and a method to determine the resources that will be impacted by events in function of their inter-connections, event propagation rules and event propagation time between resources.

The sequence of impacted resources is sorted in function of the estimated impacted time of each resource. Comparing the estimated impacted time with the actual time provides the remaining time to take actions to avoid the resource to get impacted.

According to the invention a system and method is provided.

Further aspects of the invention will now be described, by way of preferred implementation and examples, with reference to the accompanying figures.

BRIEF DESCRIPTION OF THE DRAWINGS

The above and other items, features and advantages of the invention will be better understood by reading the following more particular description of the invention in conjunction with the figures wherein.

DETAILED DESCRIPTION OF THE INVENTION

Embodiments of the invention are described herein after by way of examples with reference to the accompanying figures and drawings.

The following is a short outline of the concepts, components and wording used in the present description:

A Resource is any physical or virtual entity which has an Impacted Time (IT) and a Estimated Impacted Time (EIT). The resource contains also a Propagation Rule (PR).

A Successor of a predecessor resource is a resource that can be impacted by the predecessor resource.

A Predecessor of a successor resource is a resource that can impact the successor resource.

A Connection is a way to describe that a resource could impact another resource. Connection has an attribute which is a Propagation Time (PT).

A Source of a connection: as the connections are directed, the source connection is the resource from which the connection relationship starts.

A Target of a connection: as the connections are directed, the target connection is the resource to which the connection relationship ends.

An Incoming connection for a resource is a connection which has the resource as target.

An Outgoing connection for a resource is a connection which has the resource as source.

A CRON expression means 'Computer Run On' expression as defined in the computer world. It is commonly a string comprising several fields that represent a set of times.

The Propagation Time (PT) on a connection (i.e., edge) is the amount of time that an impact of an event takes to travel along the edge from the predecessor node to the successor node connected by the edge. The time can be a literal value or a CRON expression. The expression can be transformed to a literal value using a date as reference. CRON expression is used herein along the description to represent a time expression, but a skilled person in the art could find another way of representing such expression. If a connection has a propagation time equal to zero, it is a synchronous connection (the resource impacts the connected resource right-away). Otherwise if the propagation time is a positive value, it is an asynchronous connection (the impact resource will take a while before impacting the connected resource). The connection propagation time is either defined by the functional and non-functional requirements and the design of the solution.

The Propagation Rule (PR) defines under which conditions the resource is impacted depending on the context. The context could be the state of its predecessors or any other environment attributes. For example, in a redundant system, a rule could be that all resources that serve the current resource must be impacted to have the current resource impacted.

An external event is an event which is not propagated. An external event will determine the Impacted Time of a resource. An external event can be generated by a monitoring system and/or sensors.

A Direct Impacted Resource is a resource impacted by an external event.

The Impacted Time (IT) of a resource is the time when an event impact directly a resource, for example a resource failed at 5:00 pm.

The Estimated Impact Time (EIT) at a node is the estimated time when a resource at the node is impacted because one or multiple predecessor nodes are impacted by an event.

A Graph as defined herein in the description is a directed weighted graph in the sense of the graph theory. It is a collection of vertexes (herein named resource) and directed edges (herein named connection). Each edge has a vertex as source and a vertex as target. The edges are weighted with the propagation time. By convention, the edges (connection) are defined as playing the role of 'serve' (R1 serves on R2) but the opposite role of 'dependency' could also be defined (R2 depends on R1) without departing from the spirit and scope of the present invention. If an edge between R1 and R2 points from R1 to R2, then R1 is a predecessor of R2, and R2 is a successor of R1; and in addition, R1 is source and R2 is a target with respect to the edge. Before applying the method of the present invention for calculating the Estimated Impacted Time by traversing the graph in the direct order, the graph is reversed to represent the edges as having the 'serve' role. The resources and connections are represented by a directed graph where vertices are resources and edges are connections. Each resource has an Estimated Impacted Time property, a Propagation Rule expression and each connection has a Propagation Time property. If the propagation time property is zero, the connection is synchronous otherwise the connection is asynchronous.

Figure 1:
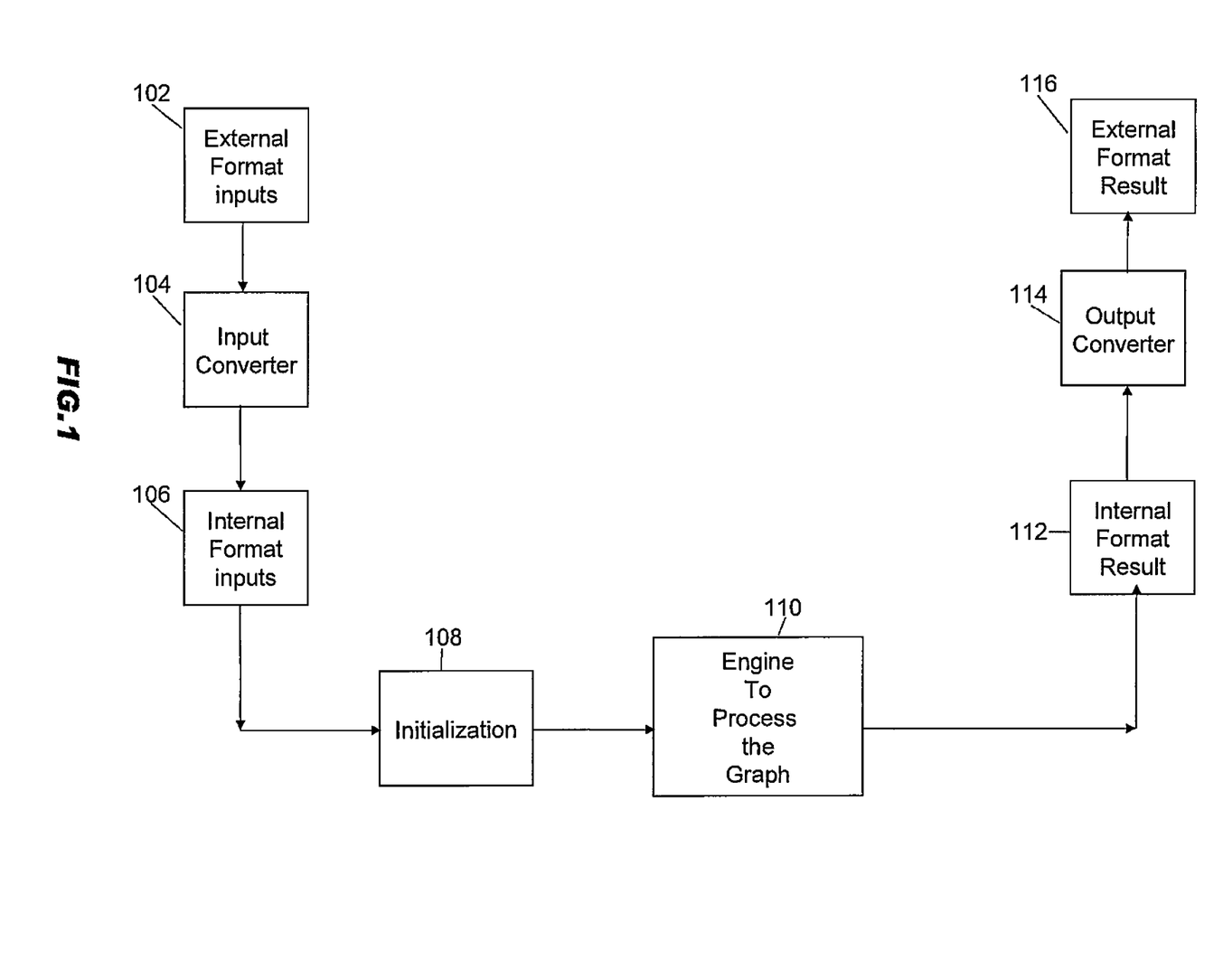
FIG. 1 depicts a general flow chart of the method of the present invention.

Going first to FIG. 1 there is depicted a flow chart of the general process of the present invention. In the first step 102 an external format of the graph is defined. The format may be defined as a table, an XML/XMI format, a database or any data-model and/or technology that can support a directed graph model. The external format is defined through a user interface by a user providing in appropriate input files information on the resources (such as name, propagation rule, impacted time), on the dependencies between the resources and further additional parameters. In step 104, the external format is called, read and transformed to generate an internal computer graph format (step 106). In a preferred embodiment, the internal graph format is a predefined data model as the one shown in FIG. 3 and further detailed. In step 108, the Estimated Impact Time attribute EIT of all resources is initialized with a positive infinite value. The positive infinite value represents the maximum number the EIT attribute can take. Those skilled in the art know that the computer language often offers a literal value called MAX_VALUE for a given numerical type.

Next step 110 is a processing phase that is repeated for each resource impacted by an external event. Step 110 is further detailed with reference to FIGS. 2 and 4. The results generated are then stored as an internal graph format (step 112). In step 114, the results are converted into a user friendly format and provided to the end user in step 116 in the form of a table, a graphic, and/or reports . . . to name some examples of generated reports.

Figure 2:
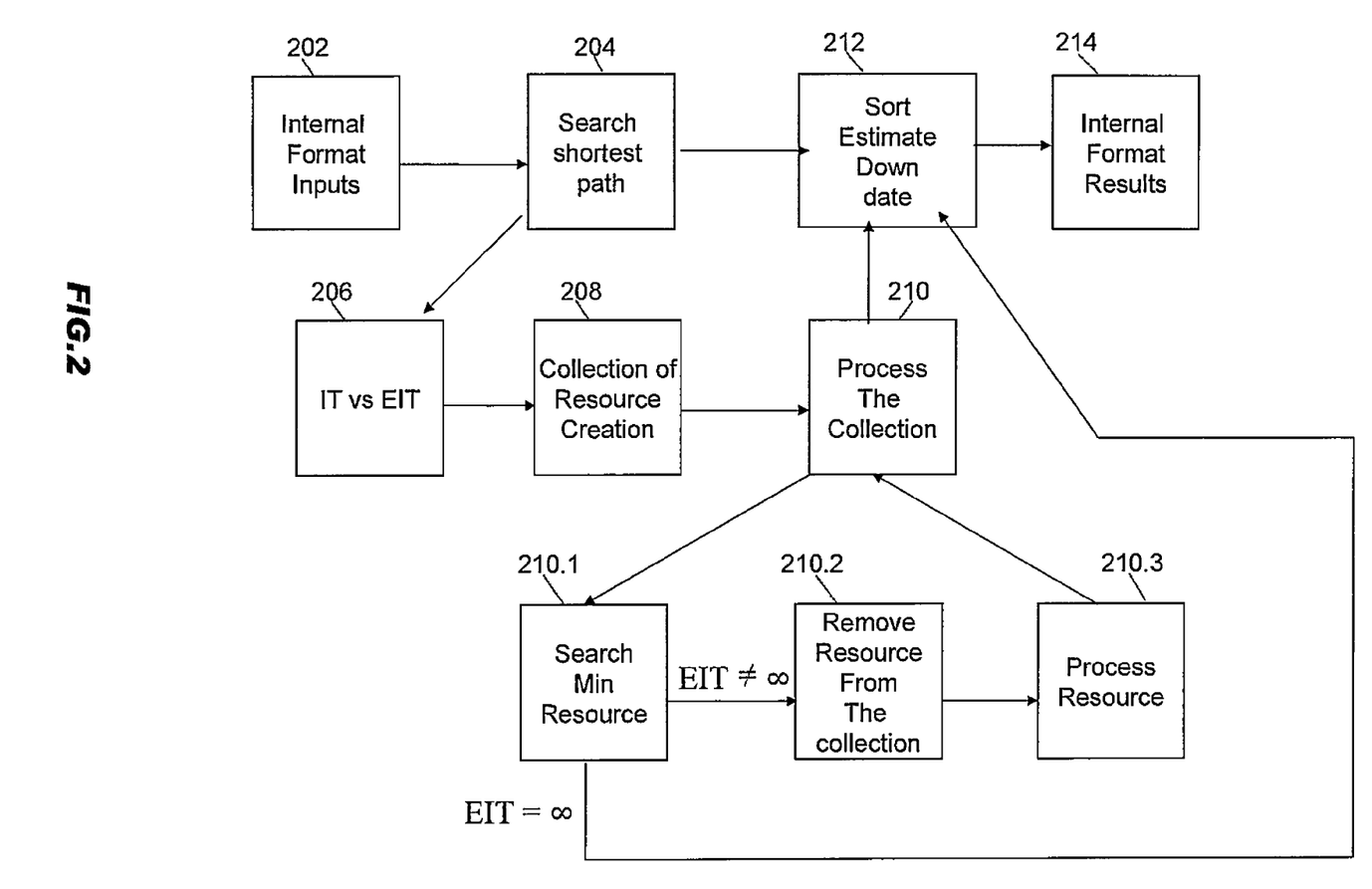
FIG. 2 shows the steps to determine the temporal sequence of impacted resources by events in function of their inter-connections, events propagation rules and events propagation time in a preferred embodiment of the present invention.

FIG. 2 details the different steps performed at step 110 of FIG. 1. As said, the process is run for each direct impacted resource. The graph representation is received by graph processor 110 as an internal computer graph format (step 202).

In step 204, a shortest path algorithm is applied on the graph. While different shortest path algorithms could be applied, in a preferred embodiment, the algorithm is a variation of the well-known Dijkstra shortest path algorithm. The shortest path is a by-product of the method which focuses on the path length to reach a resource from a resource impacted by an external event.

In step 206, the Impacted Time and the previously computed Estimated Impacted Time of the resource are compared. If the IT is less than the current EIT then the IT value is assigned to the EIT. Otherwise, the EIT is unchanged.

In step 208, a collection containing all resources as defined in the graph is created.

Next step 210 is a loop comprising steps 210.1 to 210.3 repeated until the collection is empty.

In step 210.1, the resource which has the minimum EIT is searched. If a found resource has an EIT not equal to the positive infinite value then the system will proceed with step 210.2, otherwise the system quits the loop and continues with step 212 meaning that all possible paths were calculated.

In step 210.2, the found resource is removed from the collection.

In step 210.3, the resource previously found is processed to define the EIT of its successors. A representation of resource successors and resource predecessors is shown respectively on FIGS. 5a and 5b.

For each successor of a resource, the ETT is calculated as follows:

The propagation rule determines how the ETT at a node is to be calculated depending on whether the node has a cluster rule or a non-cluster rule. In a preferred embodiment of the invention the propagation rule is defined to represent the behavior of a cluster. However, as a person skilled in the art would easily devise, any other type of propagation rule can be defined. The cluster propagation rule describes if a resource is in cluster mode or not. A resource in cluster mode means that all predecessors of the resource must be impacted by the event to have an impact on the resource. On contrary, a resource in non-cluster mode means that a single predecessor of the resource is enough to propagate the impact of the event on the resource.

Figure 5A:
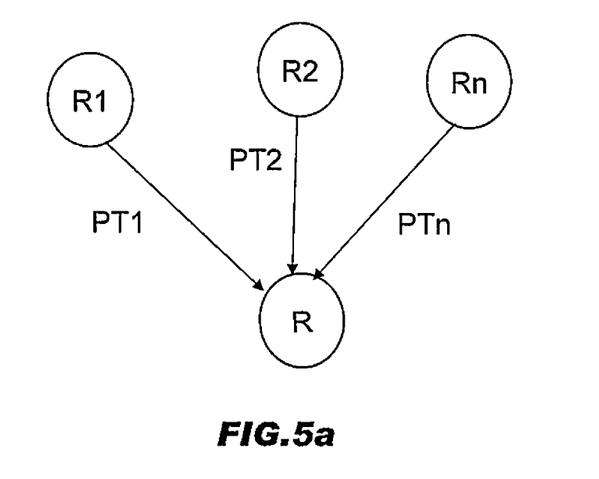
FIG. 5a and FIG. 5b depicts resources predecessors and successors.

For a resource R in a non-cluster mode (i.e, the node of the resource R has a non-cluster rule), a new EIT is computed as being the sum of the current EIT of a resource Rn and the respective Propagation Time (PTn) between R and Rn wherein R is a successor to Rn. FIG. 5a shows dependencies between resource R and its predecessors (R1, R2, . . . , Rn). As mentioned earlier PTn can be a literal value or a CRON expression. In case of a CRON expression, the EIT of Rn is preferably taken as a base date to transform the CRON expression into a literal value. If this new EIT is less than the EIT of R then the new EIT is assigned to R.

Figure 5B:
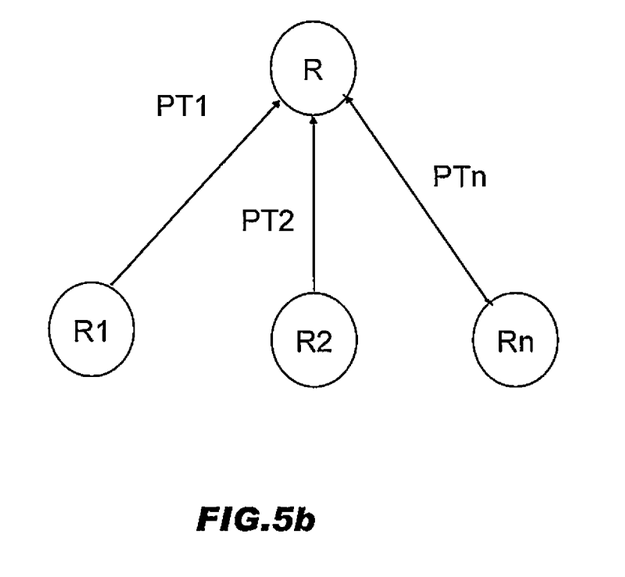

For a resource R in a cluster mode (i.e, the node of the resource R has a cluster rule), all predecessors Rn of R are visited. FIG. 5b shows dependencies between resource R and its predecessors (R1, R2, . . . , Rn). For each predecessor Rn a new EIT of R is computed as explained above for FIG. 5a. For all predecessors, the maximum of the new EITs (including the positive infinite value) is kept and if this maximum is less than the PIT of R the new EIT of R is set as the EIT of R.

Going back to FIG. 2, once the new EIT is computed for a given successor, the process returns to step 210 and loops until the collection of resources is empty.

While in the preferred embodiment the removing operation of a resource from the collection is processed after the minimum EIT search step, it could be also run after the EIT successor computation step.

After loop of steps 210.1 to 210.3 is ended, the method continues with step 212 wherein all impacted resources—having an EIT not equals to the positive infinite value—are sorted based on their EIT.

On next step 214, the results are generated in an internal computer format.

This sequence allows to find out time at which resources will be impacted and thus computing the time to clear external events to avoid the impact of those resources.

Figure 3:
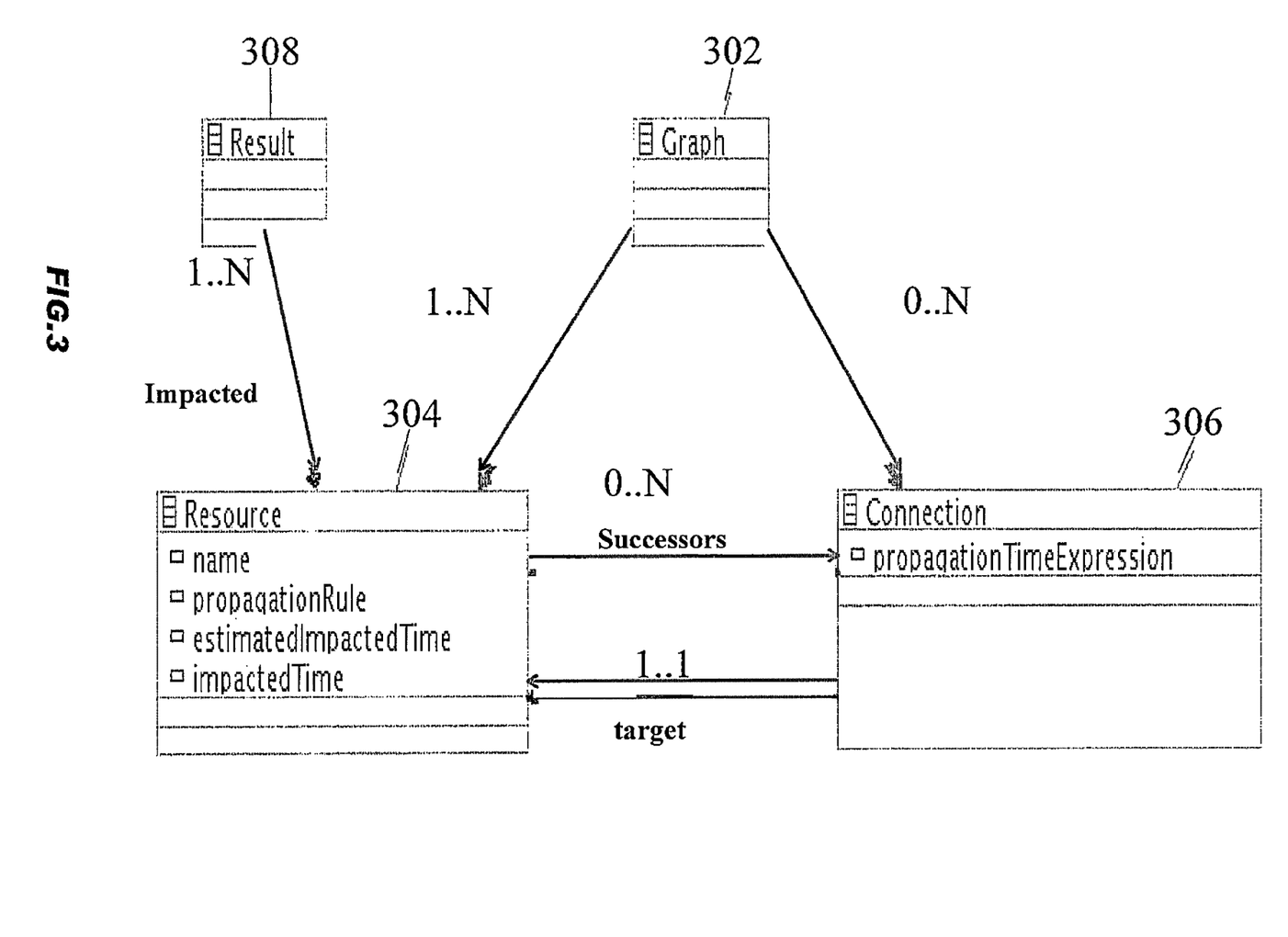
FIG. 3 depicts the data model in a preferred embodiment of the present invention.

FIG. 3 depicts a preferred data-model to store the graph representation and the results obtained by running the process of the present invention. The data-model is preferably defined in the Unified Modeling Language (UML) and contains a various number of entities including graph entity 302, resources entity 304 and connections entity 306. From the relation's direction and cardinality a skilled person would easily determine, for example, that graph entity 302 contains a set of resource entities 304 and connections entities 306.

A resource entity 304 is defined by several parameters as follows:
  a name (R);
  a propagation rule (PR), which defines how the EIT must be calculated;
  an Impacted Time (IT), which contains the time when an external event impact this resource;
  an Estimated Impacted Time (EIT), which will contains after processing the estimated time that this resource will be impacted by an external event;
  a set of connections, which provides the relationship between resources.

A connection entity 306 is defined by a propagation time expression which represents the time that an event takes to be propagated from a resource to another. This expression can be a literal value or a CRON expression.

A preferred data-model for obtaining the results 308 is a list of resources which are directly or indirectly impacted by an external event. The list is sorted based on the EIT of each resources.

While the previous illustrated data-model is a preferred one, it is to be appreciated that other designs could be used for providing a computer implemented representation of the graph data-model. For example, one could made variations on the definition of the relationships between the resources without departing from the scope of the invention. Moreover, additional attributes/entities could also be added to implement different algorithms such as a coloration or other useful attributes related to the business field where the present invention is applied, such as for example the owner name of a given resource.

Figure 4:
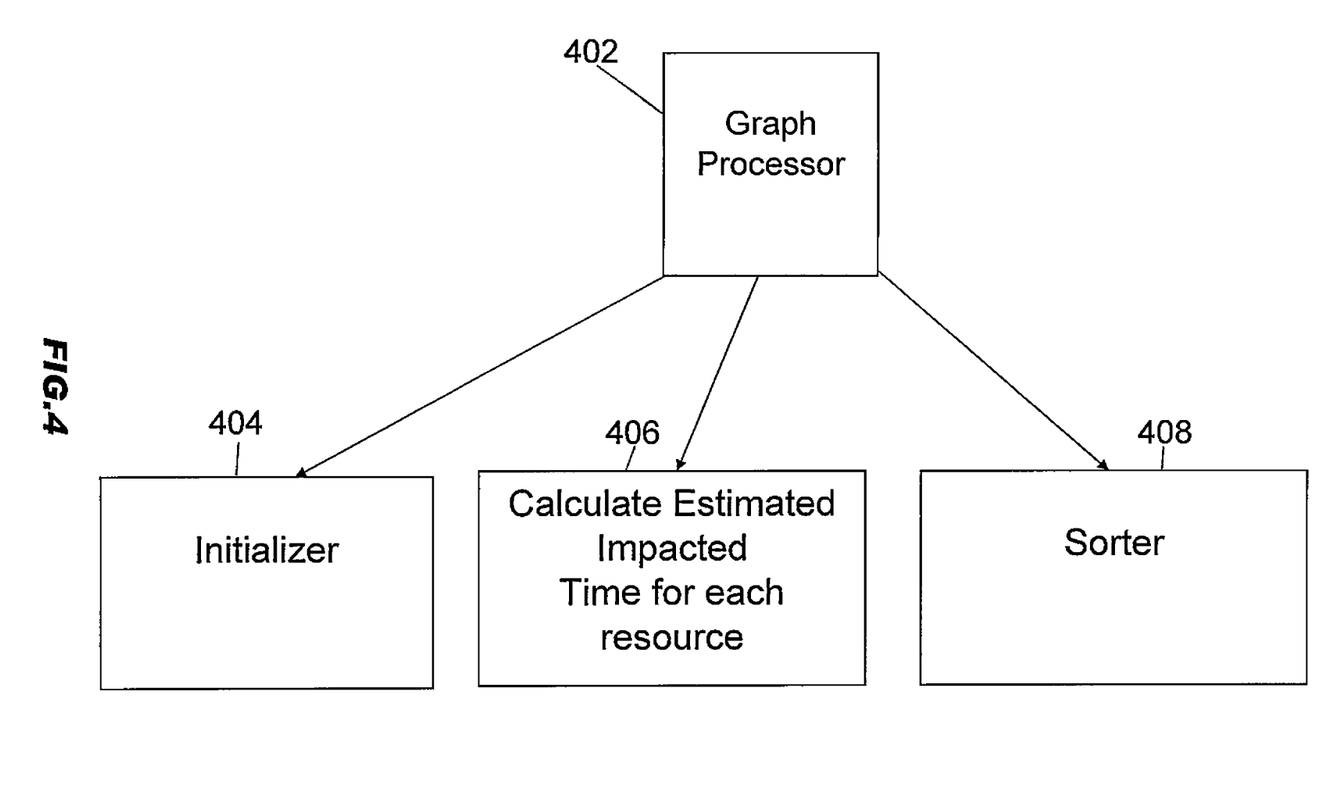
FIG. 4 depicts the different components used in the present invention.

Going now to FIG. 4, the main components used to operate the present invention are described in a preferred embodiment.

A 'Graph Processor' component (402) is the unit from which the calls of the different components are operated to run the process of the present invention.

An 'Initializer' component (404) is coupled to Graph Processor 402 to initialize all the EIT parameters to a positive infinite value.

An 'EIT Calculator' component (406) is also coupled to Graph Processor 402 and allows the calculation of the 'EIT' for each resource.

A 'Sorter' component (408) is also coupled to the Graph Processor 402 to organize the final resource sorting based on the EIT calculated for each resource.

Figure 6:
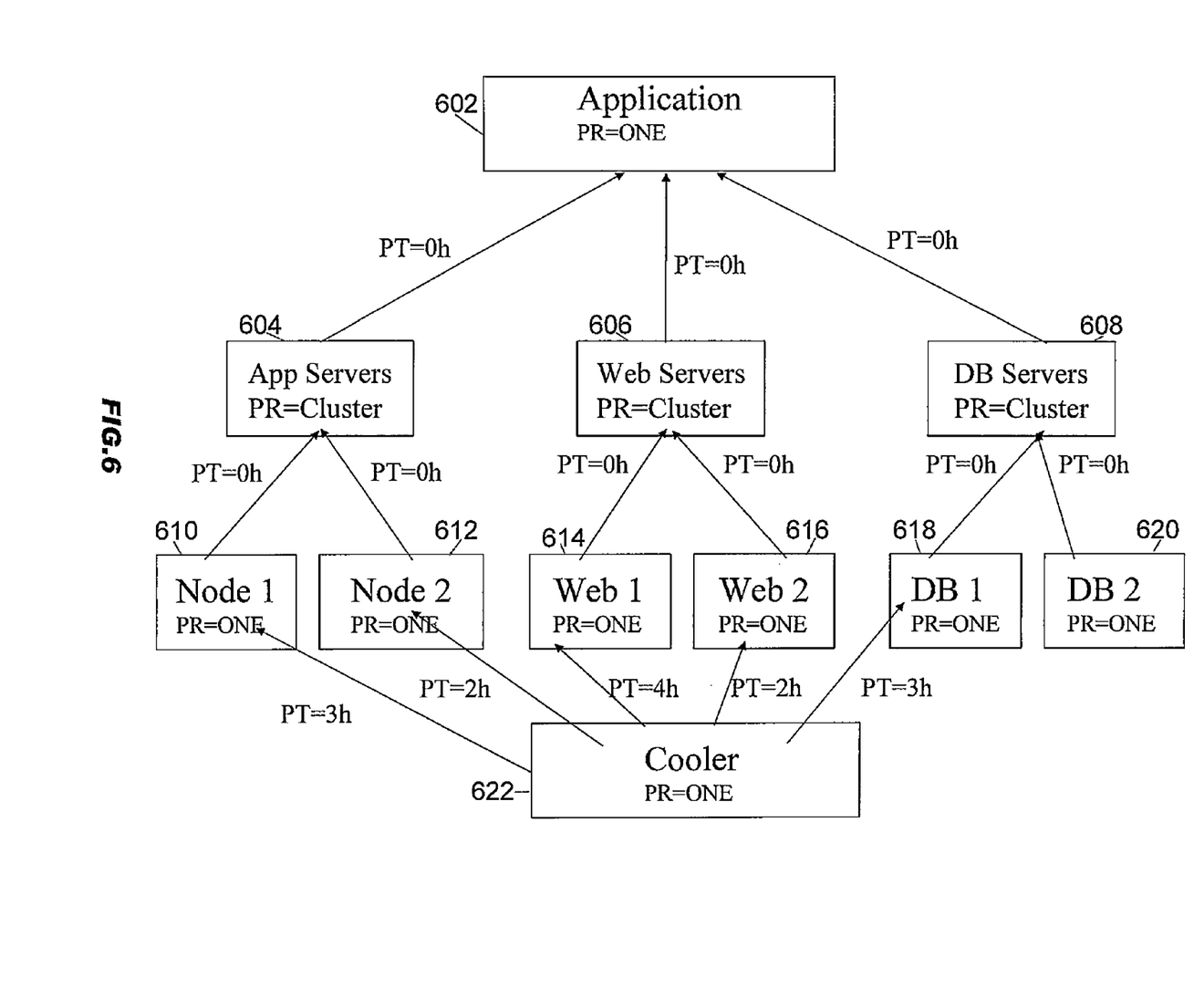
FIG. 6 depicts an example of input data.
Figure 7:
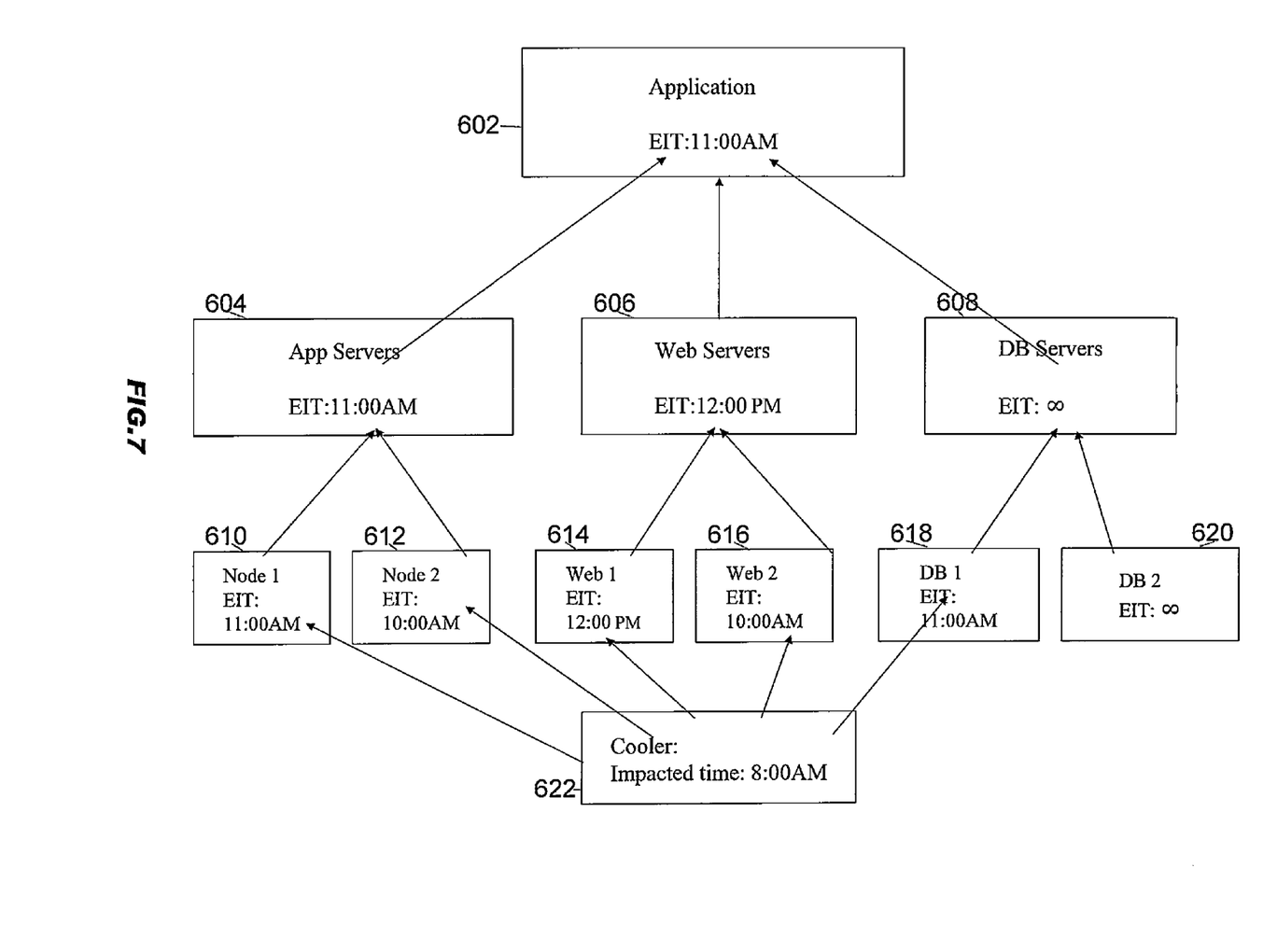
FIG. 7 depicts the result after the shortest path analysis.
Figure 8:
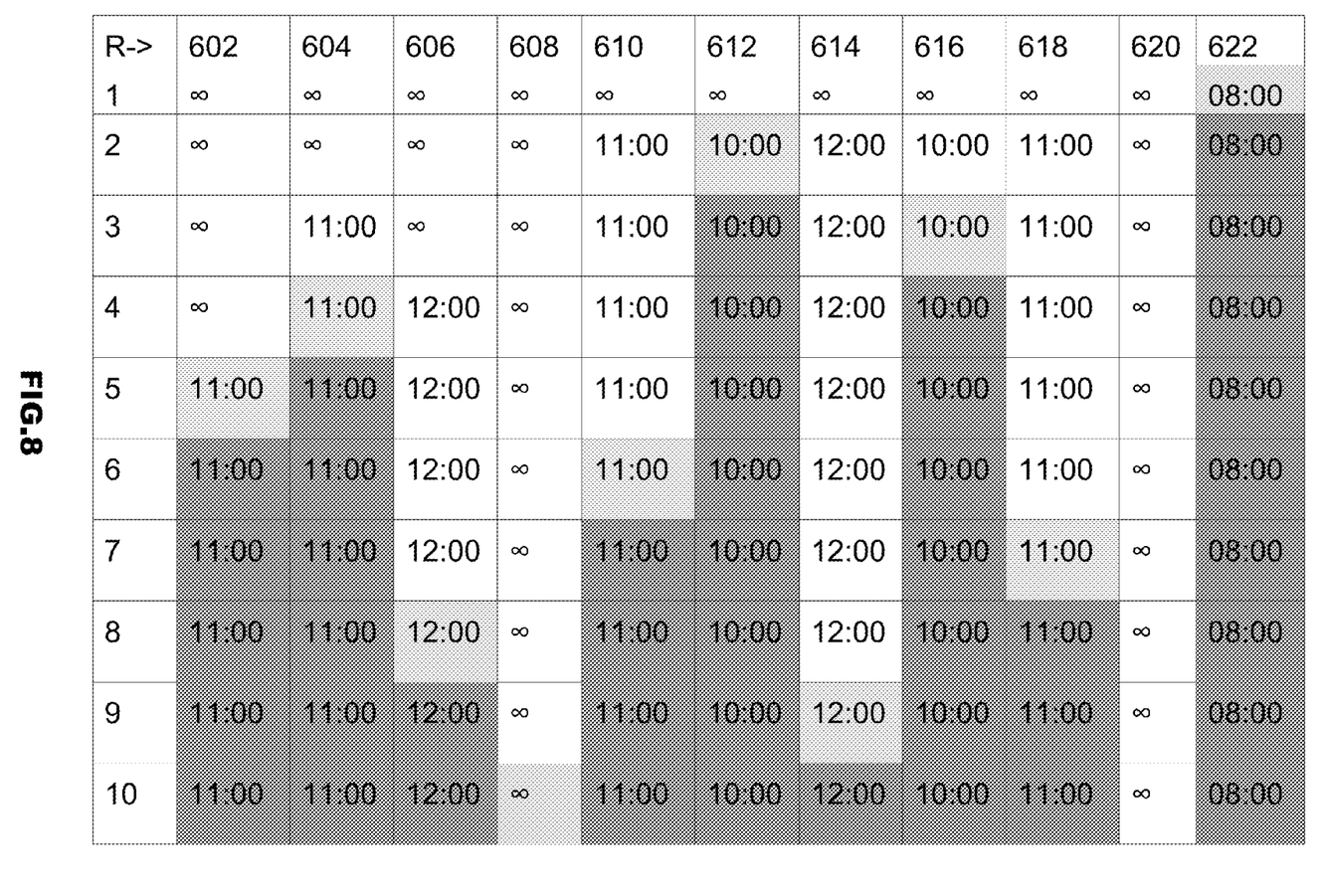
FIG. 8 depicts the different steps to get the final results.
Figure 9:
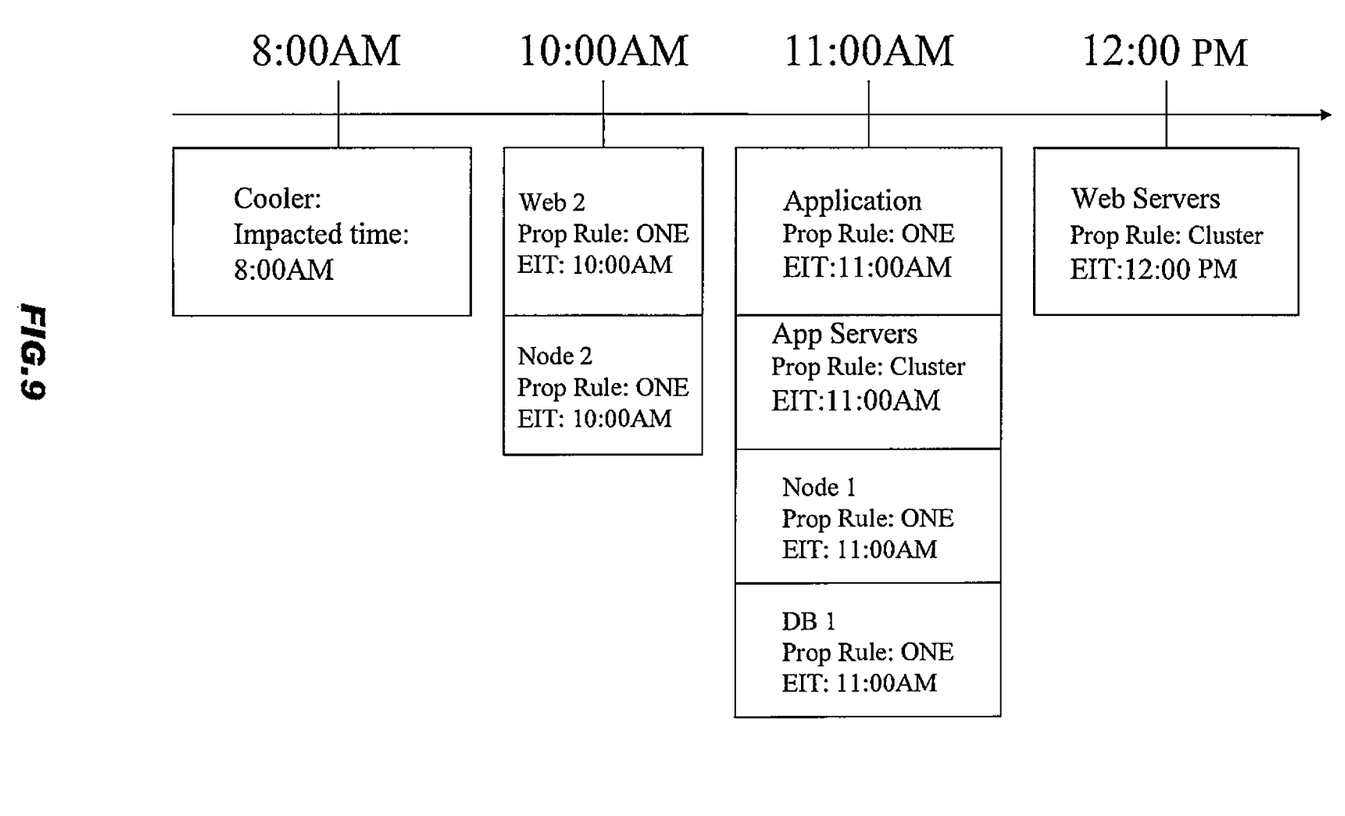
FIG. 9 depicts the final result on a time-line.

FIGS. 6 to 9 exemplify the method of the present invention at different computing steps of the process. FIG. 6 depicts an example of a directed graph with multiple nodes (602-622) and multiple edges, each node representing a resource, each edge connecting and directed from a predecessor node to a successor node of a pair of nodes of the multiple nodes, the event impacting the resource represented at an event node (622) of the multiple node, the nodes having indicated propagation rules, and the edges having indicated propagation times. The propagation time for each edge is an amount of time for an impact of the event occurring at node 622 to travel along each edge from the predecessor node to the successor node connected at each edge. FIG. 7 depicts the directed graph of FIG. 6 with updated EIT values for the nodes. The EIT of each node that is directly or indirectly connected to the event node (at which an event occurs) by one or more edges of the multiple edges is updated. FIG. 8 depicts the EIT values at each iteration. Figure.9 depicts the final EIT values on a time-line.

The example defined in FIG. 6 shows an IT environment wherein several various resources comprise each different types of relationships with other resources starting from software link with an application (602) to a coupling to a cooling system (622). The scenario described is based on a redundant 3-tiers application containing web-servers (614,616), application-servers (610,612) and Database servers (618,620). This tree tiers systems serve to provide an application (602) to the end-users. Each layer is redundant, except the cooling system one (622). All redundant systems are represented by a logical cluster component, the application server cluster (604), the web-server cluster (606) and the database-server cluster (608). All servers, except the DB2 one (620) are installed in a same room cooled by the cooling system (622).

The method of the present invention is exemplified for determining the time period each server can stay up and running after a failure occurs on the cooling system.

It is to be appreciated that from a business point of view, availability of the application (602) is mandatory.

The propagation rule (PR) defined for this example is chosen as similar to the 'Cluster' propagation rule previously described. If the PR value is set to 'Cluster' (as for resources 604,606,608), the event propagation is done if all predecessors are impacted. In opposite if the PR value is set to 'non-cluster' (also mentioned 'ONE' in the description and figure for simplification purposes) as for resources (602,610,612, 614,616,618,620,622), then only one impacted predecessor is enough to have an event propagation.

A propagation time (PT) is defined for each connection and as can be seen on the figure for example, propagation time between cooling unit (622) and Node 1 (610) is set to PT=3 Hours, while propagation time between Node 1 (610) and Application Server (604) is set to PT=0. Similarly, all (PT) are defined and corresponding PT parameter is set.

For sake of clarity, only one external event impacts the resources, which here is the failure of the cooler, but it is to be appreciated that the present method is applicable even if multiple events impact different resources of the same global environment.

At initialization of the system, the EIT of each resource is set to the positive infinite value. As the cooler is impacted by an external event, its EIT is set to the value being the minimum of its EIT or IT. In this case, as only one external event is managed, the EIT is set to the value of its IT. The impacted time is set to 8:00 am.

FIG. 8 shows in the form of a table the resources (602 to 622) on columns and on the rows the EIT values of each resource.

A collection of all the resources of the environment is created and as per computation of the shortest path (step 204 of FIG. 2), the minimum EIT of the collection is taken as the starting point, which is resource 622—the cooler—in the present case. The PT values at each edge are determined by utilizing the shortest path for each edge as determined from the shortest path computation.

For this resource, as per step 210.3 of the method the EIT for each successor is computed. The propagation rule provides the algorithm to be applied and as the propagation rule is set to 'ONE', the EIT is not impacted by the context of the resource. The new EIT for each resource is equal to the minimum between the current EIT and the sum of the EIT of the cooler and the propagation time. Line 2 of FIG. 8 shows the new EIT computed for each resource.

As already described the process loops to determine the new minimum EIT of the collection of resources which here is resource 612. If more than one resource has the minimum EIT in the collection, one resource is randomly selected.

As previously described, the method process the successors of resource 612, which is resource 604 in this case. This latter has a propagation rule of 'Cluster' with predecessors 610 and 612. Thus its new EIT is the maximum (positive infinite value excluded) between EIT of 610 and EIT of 612 meaning 11:00 am and as the current EIT of 604 is infinite, the minimum between infinite and 11:00 am is 11:00 am, so the EIT of 604 is set to 11:00 am. This is shown on line 3 of FIG. 8.

The new minimum of the collection of remaining resources is now resource 616.

The same calculation as for the resource 604 is applied and the EIT for resource 606 is set to 12:00 pm.

The new minimum of the collection is now resource 604 as per line 4 of FIG. 8.

As the propagation rule of 602 is set to 'ONE', the EIT of 602 become 11:00 am.

The new minimum of the collection is now the resource 602 as per line 5 of FIG. 8.

As this resource as no successor, there is nothing to calculate.

The new minimum of the collection is now the resource 610 as per line 6 of FIG. 8. The EIT of 604 doesn't change.

The new minimum of the collection is now the resource 618 as per line 7 of FIG. 8.

As resource 608 has a propagation rule equal to 'Cluster', the maximum between EIT calculated from all predecessors of this resource is then assigned to resource 608. The new EIT based on resource 618 is 11:00 am, the new EIT based on resource 620 is infinite. So, the new EIT of 608 is infinite.

The new minimum of the collection is now the resource 606 as per line 8 of FIG. 8.

The EIT of 602 is set to the minimum between its current EIT and the new EIT calculated based on resource 606 which is 12:00 pm and thus the EIT of 606 remains the same.

The new minimum of the collection is now the resource 614 as per line 9 of FIG. 8.

The EIT of 606 remains the same.

The new minimum of the collection is now the resource 608 as per line 10 of FIG. 8.

As this new minimum is an infinite value, the method stops, and all EITs are computed.

FIG. 7 shows the initial graph of FIG. 6 with all the computed EITs.

Going to FIG. 9 a time line of all impacted resources ordered by their EIT is shown. The first impacted resources is the cooler at the impacted time of 8:00 am, and followed by:
  The Web 2 and Node 2 resources at 10:00 am;
  The Application, the Application Servers, the DB1 and Node 1 resources at 11:00 am; and finally
  The Web 1 resource at 12:00 pm.
The time line shows that DB2 and Database Servers are not impacted resources.

This time line presented to the user, network administrator supervisor, also allows to rapidly and clearly consider that if the cooler failure is fixed before 11:00 am, the Application, which is the business critical component, will be not impacted.

Figure 10:
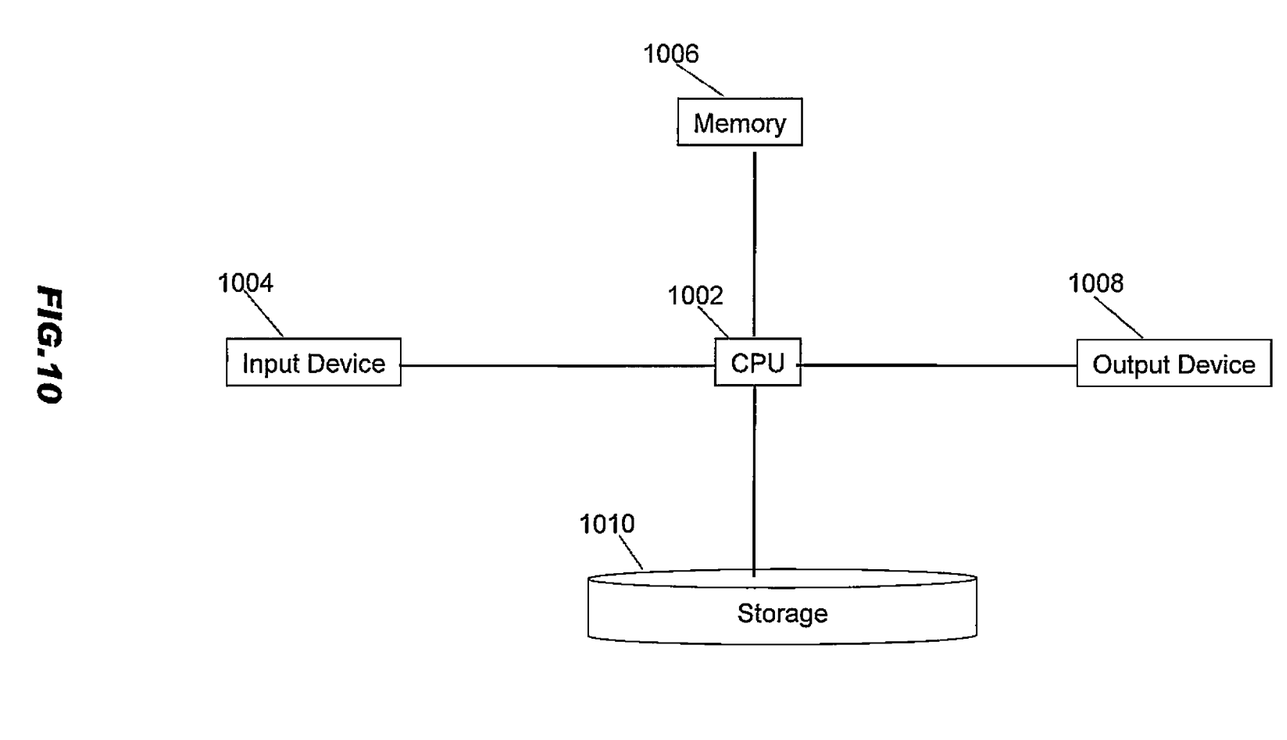
FIG. 10 depicts the implementation on a computer.

It is to be appreciated that the present invention can be implemented on a computer system as depicted in FIG. 10. The data are entered via an 'input device' (1004). The present invention will load the method from the storage (1010) and then read the data from the same location. The data and method are stored in the memory (1006). The CPU (1002) will run the method and process the data to realize the present invention. The results (e.g. a list of the updated nodes), will be sent to the output device (1008) or to the storage (1010). The present invention thus provides a computer implemented method or system and can take the form of an entirely hardware embodiment, an entirely software embodiment or an embodiment containing both hardware and software elements. In a preferred embodiment, the invention is implemented in software, which includes but is not limited to firmware, resident software, microcode, program code, etc. Thus, the computer system comprises a processor 1002, a memory 1006 coupled to the processor, and a computer readable storage device 1010 coupled to the processor, the storage device containing instructions configured to be executed by the processor via the memory to implement methods of the present invention.

Furthermore, the invention can take the form of a computer program product that comprises a computer readable tangible storage device 1010 having a computer readable program code stored therein, the program code configured to be executed by the processor 1002 of the computer system to implement methods of the present invention; e.g., a method for analyzing impact of an event on resources of a network. For the purposes of this description, a computer-readable tangible medium or tangible storage device can be any tangible apparatus or storage device that can store the program for use by, or in connection with the computer system, instruction execution system, apparatus, or device.

The medium or storage device can be an electronic, magnetic, optical, electromagnetic, infrared, or semiconductor system (or apparatus or device). Examples of a computer-readable tangible medium or storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It has to be appreciated that while the invention has been particularly shown and described with reference to a preferred embodiment to determine a temporal view of a plurality of resources, various changes in form and detail may be made therein without departing from the spirit, and scope of the invention.

Particularly, while the preferred embodiment has been described in the Information Technology area where resources are IT resources such as applications, services, and network components, the present method may be applied in different industries where a temporal view of resources is mandatory.

The invention claimed is:

1. A method for analyzing impact of an event on resources of a network, said method comprising:
a processor of a computer system generating a directed graph, said directed graph comprising multiple nodes and multiple edges, each node representing a resource, each edge connecting and directed from a predecessor node to a successor node of a pair of nodes of the multiple nodes, the event impacting the resource represented at an event node of the multiple nodes;
said processor determining a propagation time (PT) for each edge, said PT being an amount of time for an impact of the event to travel along each edge from the predecessor node to the successor node;
said processor setting an initial estimated impact time (EIT) for each node, said EIT for each node being an estimated clock time at which the event impacts each node;
after said determining the PT for each edge and said setting the initial EIT for each node, said processor updating the EIT of each node that is directly or indirectly connected to the event node by one or more edges of the multiple edges;
said processor determining which nodes of the multiple nodes are impacted by the event; and
said processor sending a list of the nodes impacted by the event to an output device of the computer system,
wherein said determining which nodes of the multiple nodes are impacted by the event comprises forming a collection of nodes consisting of the multiple nodes and initially setting the EIT of each node of the collection to a maximum number that any EIT can have (EITmax) followed by performing a loop over the collection of nodes, wherein each iteration of the loop comprises:
selecting a node in the collection that has a minimum EIT in the collection, said minimum EIT being less than EITmax;
removing the selected node from the collection; and
performing an update of the EIT of each remaining node in the collection that is a successor node to the selected node,
wherein a last iteration of the loop results in the collection consisting of one or more nodes whose EIT is EITmax, and
wherein the removed nodes are the nodes impacted by the event.

2. The method of claim 1, wherein the method further comprises:
said processor performing a shortest path computation for the directed graph from which a shortest path for each edge is determined, wherein said determining the PT for each edge utilizes the shortest path for each edge as determined from the shortest path computation.

3. The method of claim 1, wherein said setting the initial EIT for each node comprises:
setting the EIT of the event node as a time at which the event occurred at the event node; and
setting the EIT for each node except the event node with the maximum number that any EIT can have.

4. The method of claim 1, wherein the method further comprises:
said processor sorting the nodes impacted by the event, said sorting based on the EIT for each node, wherein said sending the list of the nodes impacted by the event comprises sending the list of the sorted nodes impacted by the event to the output device.

5. The method of claim 1, wherein the method further comprises:
before said updating, said processor setting a propagation rule at each node connected to at least one predecessor node by at least one respective edge, each propagation rule being either a cluster rule or a non-cluster rule, wherein each node having a cluster rule is connected to at least two predecessor nodes by respective edges, wherein each node having a non-cluster rule is connected to a single predecessor node by a single edge such that the single predecessor node is sufficient for propagating the impact of the event on the resource of said each node having a non-cluster rule, and wherein at least one node has a cluster rule and a least one other node has a non-cluster rule, and
wherein each node is denoted as a current node during said performing the update of the EIT of said each node, and wherein said performing the update for the current node comprises:
if the current node has a non-cluster rule, then computing a new EIT as equal to a sum of the EIT of the single predecessor node connected to the current node by the single edge and the PT for the single edge that connects the single predecessor node to the current node, and replacing the EIT of the current node with the new EIT if the new EIT is less than the EIT of the current node;
if the current node has a cluster rule, then calculating a new EIT of each predecessor node connected to the current node as equal to a sum of the EIT of each predecessor node connected to the current node by the respective edge that connects each predecessor node to the current node and the PT for the respective edge that connects each predecessor node to the current node, and determining a maximum EIT of the calculated new EITs, and replacing the EIT of the current node with the maximum EIT if the maximum EIT is less than the EIT of the current node.

6. The method of claim 5, wherein a unique node of the multiple nodes having a cluster rule is (i) a successor node to a first predecessor node that is indirectly connected to the event node and (ii) a successor node to a second predecessor node that is not directly or indirectly connected to the event node.

7. A computer program product, comprising a computer readable hardware storage device having a computer readable program code stored therein, said program code configured to be executed by a processor of a computer system to implement a method for analyzing impact of an event on resources of a network, said method comprising:
said processor generating a directed graph, said directed graph comprising multiple nodes and multiple edges, each node representing a resource, each edge connecting and directed from a predecessor node to a successor node of a pair of nodes of the multiple nodes, the event impacting the resource represented at an event node of the multiple nodes;
said processor determining a propagation time (PT) for each edge, said PT being an amount of time for an impact of the event to travel along each edge from the predecessor node to the successor node;
said processor setting an initial estimated impact time (EIT) for each node, said EIT for each node being an estimated clock time at which the event impacts each node;
after said determining the PT for each edge and said setting the initial EIT for each node, said processor updating the EIT of each node that is directly or indirectly connected to the event node by one or more edges of the multiple edges;
said processor determining which nodes of the multiple nodes are impacted by the event; and
said processor sending a list of the nodes impacted by the event to an output device of the computer system,
wherein said determining which nodes of the multiple nodes are impacted by the event comprises forming a collection of nodes consisting of the multiple nodes and initially setting the EIT of each node of the collection to a maximum number that any EIT can have (EITmax) followed by performing a loop over the collection of nodes, wherein each iteration of the loop comprises:
selecting a node in the collection that has a minimum EIT in the collection, said minimum EIT being less than EITmax;
removing the selected node from the collection; and
performing an update of the EIT of each remaining node in the collection that is a successor node to the selected node,
wherein a last iteration of the loop results in the collection consisting of one or more nodes whose EIT is EITmax, and
wherein the removed nodes are the nodes impacted by the event.

8. The computer program product of claim 7, wherein the method further comprises:
said processor performing a shortest path computation for the directed graph from which a shortest path for each edge is determined, wherein said determining the PT for each edge utilizes the shortest path for each edge as determined from the shortest path computation.

9. The computer program product of claim 7, wherein said setting the initial EIT for each node comprises:
setting the EIT of the event node as a time at which the event occurred at the event node; and
setting the EIT for each node except the event node with a maximum number that any EIT can have.

10. The computer program product of claim 7, wherein the method further comprises:
said processor sorting the nodes impacted by the event, said sorting based on the EIT for each node, wherein said sending the list of the nodes impacted by the event comprises sending the list of the sorted nodes impacted by the event to the output device.

11. The computer program product of claim 7, wherein the method further comprises:
before said updating, said processor setting a propagation rule at each node connected to at least one predecessor node by at least one respective edge, each propagation rule being either a cluster rule or a non-cluster rule, wherein each node having a cluster rule is connected to at least two predecessor nodes by respective edges, wherein each node having a non-cluster rule is connected to a single predecessor node by a single edge such that the single predecessor node is sufficient for propagating the impact of the event on the resource of said each node having a non-cluster rule, and wherein at least one node has a cluster rule and a least one other node has a non-cluster rule, and
wherein each node is denoted as a current node during said performing the update of the EIT of said each node, and wherein said performing the update for the current node comprises:

if the current node has a non-cluster rule, then computing a new EIT as equal to a sum of the EIT of the single predecessor node connected to the current node by the single edge and the unique PT for the single edge that connects the single predecessor node to the current node, and replacing the EIT of the current node with the new EIT if the new EIT is less than the EIT of the current node;

if the current node has a cluster rule, then calculating a new EIT of each predecessor node connected to the current node as equal to a sum of the EIT of each predecessor node connected to the current node by the respective edge that connects each predecessor node to the current node and the unique PT for the respective edge that connects each predecessor node to the current node, and determining a maximum EIT of the calculated new EITs, and replacing the EIT of the current node with the maximum EIT if the maximum EIT is less than the EIT of the current node.

12. The computer program product of claim 11, wherein a unique node of the multiple nodes having a cluster rule is (i) a successor node to a first predecessor node that is indirectly connected to the event node and (ii) a successor node to a second predecessor node that is not directly or indirectly connected to the event node.

13. A computer system comprising a processor, a memory coupled to the processor, and a computer readable storage device coupled to the processor, said storage device containing program code configured to be executed by the processor via the memory to implement a method for analyzing impact of an event on resources of a network, said method comprising:

said processor generating a directed graph, said directed graph comprising multiple nodes and multiple edges, each node representing a resource, each edge connecting and directed from a predecessor node to a successor node of a pair of nodes of the multiple nodes, the event impacting the resource represented at an event node of the multiple nodes;

said processor determining a propagation time (PT) for each edge, said PT being an amount of time for an impact of the event to travel along each edge from the predecessor node to the successor node;

said processor setting an initial estimated impact time (EIT) for each node, said EIT for each node being an estimated clock time at which the event impacts each node;

after said determining the PT for each edge and said setting the initial EIT for each node, said processor updating the EIT of each node that is directly or indirectly connected to the event node by one or more edges of the multiple edges;

said processor determining which nodes of the multiple nodes are impacted by the event; and said processor sending a list of the nodes impacted by the event to an output device of the computer system, wherein said determining which nodes of the multiple nodes are impacted by the event comprises forming a collection of nodes consisting of the multiple nodes and initially setting the EIT of each node of the collection to a maximum number that any EIT can have (EITmax) followed by performing a loop over the collection of nodes, wherein each iteration of the loop comprises:

selecting a node in the collection that has a minimum EIT in the collection, said minimum EIT being less than EITmax;

removing the selected node from the collection; and performing an update of the EIT of each remaining node in the collection that is a successor node to the selected node, wherein a last iteration of the loop results in the collection consisting of one or more nodes whose EIT is EITmax, and wherein the removed nodes are the nodes impacted by the event.

14. The computer system of claim 13, wherein the method further comprises:

said processor performing a shortest path computation for the directed graph from which a shortest path for each edge is determined, wherein said determining the PT for each edge utilizes the shortest path for each edge as determined from the shortest path computation.

15. The computer system of claim 13, wherein said setting the initial EIT for each node comprises:

setting the EIT of the event node as a time at which the event occurred at the event node; and setting the EIT for each node except the event node with a maximum number that any EIT can have.

16. The computer system of claim 13, wherein the method further comprises:

said processor sorting the nodes impacted by the event, said sorting based on the EIT for each node, wherein said sending the list of the nodes impacted by the event comprises sending the list of the sorted nodes impacted by the event to the output device.

17. The computer system of claim 13, wherein the method further comprises:

before said updating, said processor setting a propagation rule at each node connected to at least one predecessor node by at least one respective edge, each propagation rule being either a cluster rule or a non-cluster rule, wherein each node having a cluster rule is connected to at least two predecessor nodes by respective edges, wherein each node having a non-cluster rule is connected to a single predecessor node by a single edge such that the single predecessor node is sufficient for propagating the impact of the event on the resource of said each node having a non-cluster rule, and wherein at least one node has a cluster rule and a least one other node has a non-cluster rule, and wherein each node is denoted as a current node during said performing the update of the EIT of said each node, and wherein said performing the update for the current node comprises:

if the current node has a non-cluster rule, then computing a new EIT as equal to a sum of the EIT of the single predecessor node connected to the current node by the single edge and the unique PT for the single edge that connects the single predecessor node to the current node, and replacing the EIT of the current node with the new EIT if the new EIT is less than the EIT of the current node;

if the current node has a cluster rule, then calculating a new EIT of each predecessor node connected to the current node as equal to a sum of the EIT of each predecessor node connected to the current node by the respective edge that connects each predecessor node to the current node and the unique PT for the respective edge that connects each predecessor node to the current node, and determining a maximum EIT of the calculated new EITs, and replacing the EIT of the current node with the maximum EIT if the maximum EIT is less than the EIT of the current node.

* * * * *